United States Patent [19]

Rhodes, Jr. et al.

[11] 3,933,938

[45] Jan. 20, 1976

[54] GRAFTED POLYETHER DIOL-BASED THERMOPLASTIC URETHANE ELASTOMER

[75] Inventors: Richard D. Rhodes, Jr., Somersworth; William M. Humphrey, Jr., Dover, both of N.H.

[73] Assignee: McCord Corporation, Detroit, Mich.

[22] Filed: May 15, 1974

[21] Appl. No.: 469,959

[52] U.S. Cl. ......... 260/859 R; 260/77.5 AP; 293/60
[51] Int. Cl.² .......................................... C08L 27/00
[58] Field of Search ................. 260/859 R, 77.5 AP; 293/60

[56] References Cited
UNITED STATES PATENTS

| | | | |
|---|---|---|---|
| 3,304,273 | 2/1967 | Stamberger | 260/2.5 AM |
| 3,420,796 | 1/1969 | Matsubayashi et al. | 260/77.5 AP |
| 3,652,639 | 3/1972 | Pizzini et al. | 260/859 R |
| 3,744,835 | 7/1973 | Carbone et al. | 293/60 |

*Primary Examiner*—M. J. Welsh
*Attorney, Agent, or Firm*—McGlynn and Milton

[57] ABSTRACT

A relatively inexpensive injection molding-grade thermoplastic polyurethane is based on a modified polyether diol. This elastomer has the inherent toughness, abrasion resistance and general good mechanical properties of the ether-based urethanes. Its temperature insensitivity and low temperature flexability are, however, exceptional. It is flexible to impact at −50°F and stiff enough at 250°F to allow painting without distortion.

The modified polyether polyol is a poly (oxypropylene) diol reacted with a 50/50 styrene/acrylonitrile monomer mixture using a free radical catalyst. This grafted polyol is preferably blended with a minor amount of a poly alkene ether diol and reacted with an aromatic diisocyanate to form a prepolymer in a known manner. The prepolymer is thereafter reacted with a $C_2$ to $C_6$ alkane diol, pan cast, cured and aged, followed by grinding to one-fourth and three-eighth inch granules to give the molding composition.

5 Claims, 1 Drawing Figure

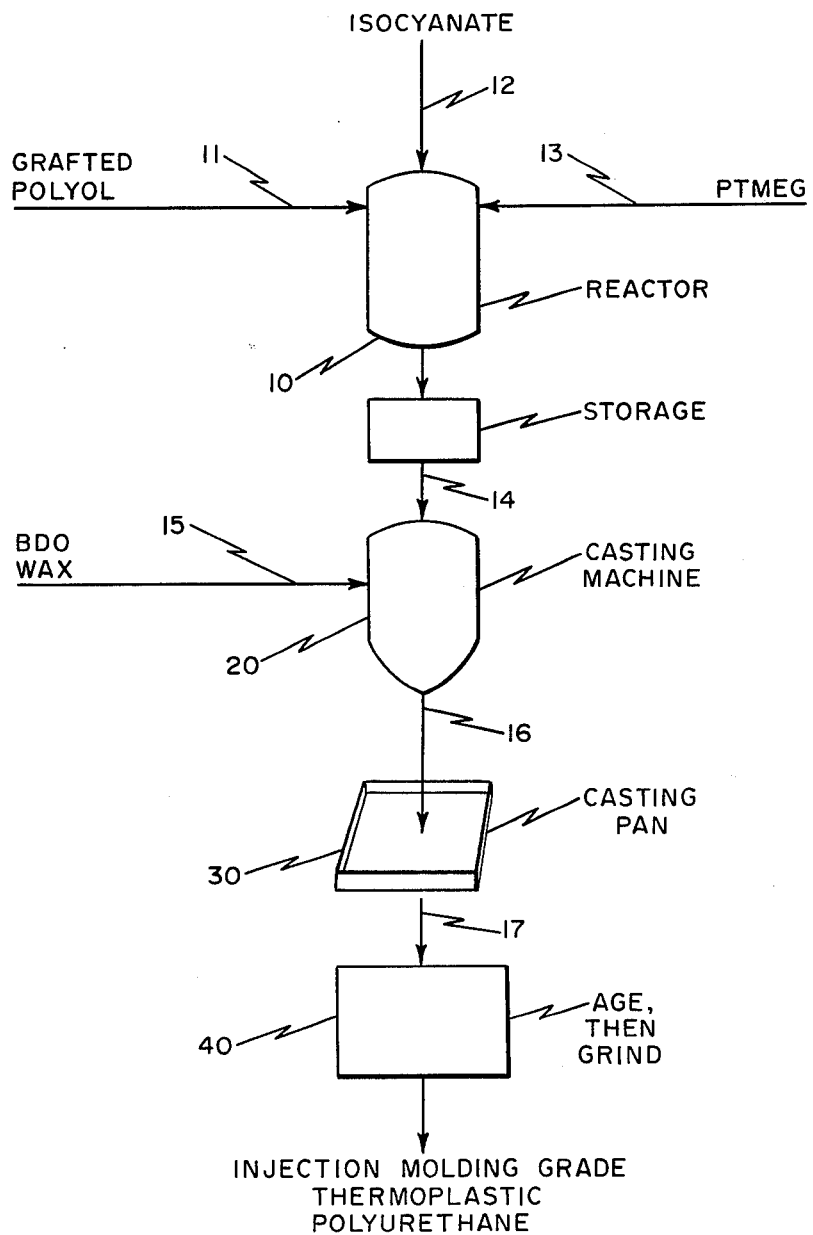

GRAFTED POLYETHER DIOL-BASED THERMOPLASTIC URETHANE ELASTOMER

Thermoplastic polyurethanes have been prepared from polyether and polyester polyols. The polyester polymers are relatively expensive and have good to excellent physical properties overall but such polymers have generally poor humidity resistance and low temperature properties. The only polyether-based polymers which are of a quality adequate for use in demanding applications such as automobile exterior trim parts are the PTMEG-based polymers which are expensive. Other polyether-based systems, while less expensive, have poor molding and physical properties.

It has now been found that a polyether diol-based urethane elastomer of injection molding quality and with good to excellent overall physical properties can be prepared from a polyether diol grafted with or which has been reacted with a styrene/acylonitrile monomer mixture using a free radical catalyst. See U.S. Pat. Nos. 3,304,273; 3,383,351 and 3,418,354.

This modified polyether polyol is preferably admixed with a minor amount of a poly alkane ether diol and the mixture reacted in the usual manner with an aromatic polyisocyanate, preferably an aromatic diisocyanate to prepare a prepolymer having a free NCO content in the range of 7 to 15%.

The prepolymer is thereafter reacted with a short chain alkane diol and cast in slab form or extruded and pelletized. After curing and aging for a few days the resulting cast elastomer is ground to prepare the molding composition. Materials such as colorants and stabilizers may be blended into the ground elastomer to give a complete molding composition.

The molding composition can be molded in any conventional manner such as injection molding at 400° to 500°F in a screw-type machine. The molded product is generally tough and abrasion resistant and, somewhat surprisingly, has superior humidity and aging resistance, and superior low temperature flexability.

For, example, an elastomer of this invention having a flex modulus (ASTMD-790) of 15000 psi will consistently pass a −20°F painted Dart Impact (FBMS-2-23) and cold flex test (FBTM-58-5).

Generally speaking the properties of the elastomers of this invention will fall within the following ranges:

Examples of automobile parts that have been made using the elastomer of this invention and tested with satisfactory results are: General Motors 1974: (1)Riviera Center Sight Shield, Part No. 9694424-439 and (2) Oldsmobile "B" corner Sight Shield, Part No. 9694662-693.

DRAWING

The drawing attached to and forming a part of this invention is a schematic illustration of the process of this invention. The elastomer can be prepared by the one shot or prepolymer procedure, the latter being illustrated.

The following table gives the ingredients and the preferred proportions that can be used:

|  | Parts by Weight |
|---|---|
| Modified polyol | 100 |
| Poly alkane ether diol | 5-50 |
| Aromatic polyisocyanate | 40 to 100 |
| $C_2-C_6$ alkane diol | 10 to 40 |

The modified polyol is a 2000 to 5000 molecular weight reaction product of:

a. 70 to 90 weight percent of a 1000 to 4000, preferably 2400 to 3200, molecular weight poly (oxy $C_1-C_4$ alkene) diol, reacted by a free radical polymerization with b. 10 to 30 weight percent of a monomer mixture of 1 part by weight of a vinylaromatic and, 0.1 to 9, preferably 0.3 to 3 parts of an olefinic $C_2-C_6$ nitrile.

The polyalkane ether diol has a molecular weight in the range of 500 to 2500, preferably 650 to 1500. While quantities as low as 2 parts by weight will have an observable and desirable effect on the final polymer and quantities as high as 70 parts by weight will produce a useful thermoplastic polymer, for demanding automotive applications the physical properties given by the above range of 5–50 parts by weight of the poly alkene ether diol are preferred.

The aromatic polyisocyanate is any of the commercially used ones and is preferably selected from the group consisting of 4, 4' -diphenylmethane diisocyanate (MDI); tolylene diisocyanate (TDI); 1,5 naphthalene diisocyanate; dianisidine diisocyanate (DADI); 3, 3' -dimethyl 4, 4' -biphenyl diisocyanate (TODI); phenylene diisocyanate (PDI) and 4, 4' -bipheneyl diisocyanate (XDI).

The straight-chain alkane diol is preferably endterminated with the hydroxy groups.

|  |  | Test Method |
|---|---|---|
| Specific Gravity | 1.14± 0.02 | ASTMD-792 |
| Tensile Strength, psi | 2500 (minimum) | ASTMD-412 |
| Elongation, % | 400 (minimum) | ASTMD-412 |
| Tear Strength, pi | 400 (minimum) | ASTMD-624 |
| Hardness, Shore D, 5 sec. | 41± 3 | ASTMD-2240 |
| Modulus of Elasticity, psi (Flexual Modulus) | 11,000 (minimum) | ASTMD-790 |
| Tensile, Set, % (at 200% Elongation) | 60 (maximum) | ASTMD-412 |
| Aged Properties |  |  |
| Heat Aging: 70 hrs/212°F, %change |  |  |
| Tensile strength | −15 (maximum) | ASTMD-412 |
| Elongation | −20 (maximum) | ASTMD-412 |
| Dart Impact | Pass | FBMS-2-23 |
| Humidity Aging: 7 days/ 175°F/100% R.H., %change |  |  |
| Tensile strength | −15 (maximum) | ASTMD-412 |
| Elongation | −15 (maximum) | ASTMD-412 |

The prepolymer process is quite straightforward but if the following procedure is not followed with reasonable care a thermoset and sometimes microcellular elastomer may result. The index of the mixture, the reaction temperatures, and water contents of the ingredients should be closely controlled, as is known.

With reference to the drawing, the two polyols, the grafted polyol via line 11 and the poly alkene ether diol via line 13, are brought together in a reactor 10 degassed and heated, for example, to 235°F.

The aromatic polyisocyanate is then added to the reactor via line 12 and the mixture is allowed to exotherm, for example, to 250°F. It is then degassed and the free NCO content obtained. Preferably the free NCO is in the range of 4 to 15, preferably 8 to 10. In the following examples, A and B, it was 11.27 and 9.55 respectively. The prepolymer can then be stored in readiness for the next step.

The short chain diol such as 1,4 -butanediol (BDO), is separately prepared, and dried if necessary, and mixed with the wax release agent, if a wax is to be used. The diol mixture and the prepolymer, by lines 15 and 14 respectively, are brought together in a casting machine 20 in a continuous manner at about 230°F. After thorough mixing of the two ingredients, the mixture is cast out via line 16 into a casting pan, 30 which is preferably maintained at a temperature above 210°F. The cast layer can for example be 1 inch thick and, after being allowed to set 4 or 5 minutes, can be cut into 3 inches × 3 inches chunks, removed and placed in containers, as indicated by line 17 and block 40. After having been aged at 40 for a week or so the elastomer can be ground to the size desired for molding and mixed with whatever additional materials may be desired. Alternatively, the mixture from line 16 can be extruded and pelletized to give a moldable composition.

It has also been found that by the addition of catalyst to the mixture in the casting machine 20, the reactions can be speeded up so that polyurethane can be directly cast into a mold to produce a molded product. The catalysts used can be of the dibutyl-tin-dilaurate, mercaptide or other known type and the casting temperature can be substantially lower, say 105°F, with the mold being at 160°–180°F.

The following table gives examples of the invention prepared according to the illustrated process.

The grafted polyol was Union Carbide Company's NIAX D-432, a polymer of about 4000 molecular weight made by reacting 80 weight percent of a 2800 molecular weight poly (oxyalkylene) diol with 20 weight percent of a 50/50 (by weight) styrene/acrylonitrile monomer mixture in the presence of a free radical catalyst (azobisisobutronitrile), as described in Union Carbide's Belgian Patent No. 788,115. The poly (oxyalkylene) diol is made by first reacting propylene glycol with propylene oxide and then subsequently with ethylene oxide so that the chains terminate in ethylene oxide units.

The poly alkylene ether diol was a polytetramethylene ether glycol, (PTMEG), Polymeg 1000, sold by the Quaker Oats Company, Chemical Division, Merchandise Mart Plaza, Chicago, Ill., 60545. It has a molecular weight of 1000. E. I. duPont de Nemours Polyglycol 1000 can also be used.

The "MDI" was 4, 4' diphenylmethane diisocyanate. The "BDO" was 1, 4-butanediol.

The wax was an ethelyne-bis-stearamide, Advawax 280°F, sold by Cincinnati Milacron Chemical Inc., Reading, Ohio, 45215.

What is claimed is:

1. An injection molding-grade thermoplastic polyurethane having good low temperature properties made by reacting the following:

|  | Parts by weight |
|---|---|
| Grafted polyol | 100 |
| poly alkane ether diol | 2 to 70 |
| Aromatic polyisocyanate | 40 to 100 |
| $C_2$–$C_6$ alkane diol | 10 to 40 |

Wherein:
said grafted polyol is a 2000 to 5000 molecular weight copolymer of:
a. 70 to 90 weight percent of a 1000 to 4000 molecular weight poly (oxy $C_1$–$C_4$ alkene) diol, reacted by a free radical polymerization with
b. 10 to 30 weight percent of a monomer mixture of 1 part by weight of a vinylaromatic and 0.1 to 9 parts of an olefinic $C_2$–$C_6$ nitrile, and

EXAMPLES

|  | A | | B | |
|---|---|---|---|---|
|  | E | PBW | E | PBW |
| Modified polyol | 0.5 | 100 | 0.75 | 100 |
| PTMEG | 0.5 | 28.24 | 0.25 | 9.42 |
| MDI | 6.0 | 85.64 | 6.0 | 57.0 |
| BDO | 5.02 | 26.20 | 5.02 | 17.4 |
| Wax | 0.3 | 0.63 | 0.3 | 0.55 |
| Specific Gravity | | 1.15 | | 1.14 |
| Hardness, Shore D (5 secs) | | 45 | | 40 |
| Tensile Strength (orig.) | | 2995 | | 2624 |
| after 70 hrs./212°F | | (−5.0%)2846 | | (−10.5%)234 |
| after 7 da/175°F/100%RH | | (−11.1%) | | (−13.3%)227 |
| Elongation (orig.) | | 537% | | 503% |
| after 70 hrs./212°F | | (−13.8%)463% | | (−14.5%)430 |
| after 7 da./175°F/100%RH | | (−8.2%)493% | | (−4.6%)480% |
| Tear Strength (Die C) | | 507 | | 416 |
| Stiffness | | | | |
| at 72°F 0.5 in lbs. (orig.) | | Exceeded scale limit | | 9855 |
| at −20°F 3.0 in lbs. | | 35041 | | 20787 |
| after 70 hrs./212°F 0.5 in/lbs | | Exceeded scale limit | | (+2.0%)10060 |
| at 160°F 0.25 in lbs | | Exceeded scale limit | | 5595 |
| Tensile set at 200% elongation | | 62.5% | | 53.1% |
| Dart impact-flex at −20°F (FB) | | | | |
| as received | (no fracture) | pass | | pass |
| after 70 hrs./212°F | (no fracture) | pass | | pass |
| Stretch test at 250°F | (4% max.) | No change | | 1.6% |

In the table:
E=number of equivalents
PBW=parts by weight
FB=a Fisher Body specification said polyalkylane ether diol has a molecular weight in the range of 500 to 2500.

2. The polyurethane of claim 1 wherein said grafted polyol, poly alkane ether diol and aromatic polyisocyanate are first reacted to form a prepolymer having a free NCO in the range of 9 to 10, followed by addition of said $C_2-C_6$ alkane diol.

3. The polyurethane of claim 2 wherein:
said grafted polyol is made with a 2400 to 3200 poly (oxypropylene-ethylene) diol and a 50/50 styrene/acrylonitrile monomer mixture.

said poly alkane ether diol is a 650 to 1500 molecular weight polytetramethylene ether glycol;
said aromatic polyisocyanate is MDI and
said $C_2-C_6$ alkane diol is 1, 4 butanediol.

4. The polyurethane of claim 3 wherein the mixture is cast as a slab at a temperature above 210°F, broken up, cured for a few days and ground to size for injection molding.

5. An automobile exterior trim component made from the polyurethane of claim 1.

* * * * *